United States Patent
Turner

(10) Patent No.: US 10,939,269 B2
(45) Date of Patent: Mar. 2, 2021

(54) PUBLIC DISPLAY SYSTEM ENABLING MEDIA MODIFICATION

(71) Applicant: Mike R. Turner, Frankfort, IL (US)

(72) Inventor: Mike R. Turner, Frankfort, IL (US)

(*) Notice: Subject to any disclaimer, the term of this patent is extended or adjusted under 35 U.S.C. 154(b) by 934 days.

(21) Appl. No.: 14/711,687

(22) Filed: May 13, 2015

(65) Prior Publication Data

US 2015/0334163 A1    Nov. 19, 2015

Related U.S. Application Data

(60) Provisional application No. 61/994,114, filed on May 15, 2014.

(51) Int. Cl.
*H04W 4/80* (2018.01)
*H04L 29/08* (2006.01)
(Continued)

(52) U.S. Cl.
CPC .............. *H04W 4/80* (2018.02); *G06Q 20/22* (2013.01); *G06Q 30/0251* (2013.01);
(Continued)

(58) Field of Classification Search
CPC .... G06Q 30/02; G06Q 30/0241; G06Q 10/06; G06Q 30/0251; G06Q 50/01; G06Q 50/26; G06Q 10/00; G06Q 10/0631; G06Q 20/22; G06Q 30/00; G06Q 30/0252; G06Q 30/0259; G06Q 30/0261; G06Q 30/0273; G06Q 50/00; G06Q 90/00; G06Q 20/1085; G06Q 20/3223; G06Q 20/18; G06Q 20/327; G06Q 40/00; G06Q 20/40; G06Q 20/042; G06Q 20/3221; G06Q 20/4016; G06Q 20/04; G06Q 20/341; G06Q 20/32; G06Q 30/0207–0277; G06F 17/2705; G06F 17/30256; G06F 3/04883; G06F 3/0484; G07F 17/3244; G07F 19/20; G07F 19/211; G07F 19/203; G07F 17/16; G07F 19/201; G07F 7/04; G07F 7/0886; G07F 7/1008;
(Continued)

(56) References Cited

U.S. PATENT DOCUMENTS 5,933,829 A    8/1999 Durst et al.
6,542,933 B1   4/2003 Durst, Jr. et al.
(Continued)

*Primary Examiner* — Chinyere Mpamugo
(74) *Attorney, Agent, or Firm* — Neal, Gerber & Eisenberg LLP

(57) ABSTRACT

Systems and methods are disclosed that allow users to alter fixed or stationary media displays, According to certain embodiments, the system comprises a mobile device, a remote server and a frame capable of presenting a digital image. The frame comprises a machine-readable indicia. The mobile device contains a reader application capable or reading and decoding the machine-readable indicia to determine instructions for accessing the remote server and presenting data from within the indicia that identifies the frame to the server. The server then requests and receives a digital media file from the mobile device and transmits it to the frame. The frame is equipped with a wireless receiver that receives the digital image, and a processor that causes it to be displayed. Various checks and verifications may be performed by the server. Various other aspects and embodiments are disclosed.

14 Claims, 6 Drawing Sheets

(51) Int. Cl.
*H04L 29/06* (2006.01)
*G06Q 20/22* (2012.01)
*G06Q 30/02* (2012.01)
*H04W 12/08* (2009.01)

(52) U.S. Cl.
CPC .......... *H04L 65/1073* (2013.01); *H04L 67/06* (2013.01); *H04W 12/08* (2013.01)

(58) Field of Classification Search
CPC ............ G06K 9/0063; G06K 9/00771; G06K 9/00362; G06K 9/00711; G06K 9/6202; G06K 9/46; G06K 9/52; G06K 9/6267; G06K 9/00442; G06K 9/18; G06K 19/08; G06K 7/0004; H04W 4/80; H04W 12/08; H04W 12/00522; H04W 4/02; H04L 67/06; H04L 65/1073
See application file for complete search history.

(56) References Cited

U.S. PATENT DOCUMENTS

| | | |
|---|---|---|
| 6,675,165 B1 | 1/2004 | Rothschild |
| 6,993,573 B2 | 1/2006 | Hunter |
| 7,088,355 B1* | 8/2006 | Ochi .................... G09G 3/3611 345/211 |
| 7,450,163 B2 | 11/2008 | Rothschild |
| 7,456,872 B2 | 11/2008 | Rothschild |
| 7,991,792 B2 | 8/2011 | Rothschild |
| 8,238,885 B2 | 8/2012 | Mueller et al. |
| 2002/0169724 A1* | 11/2002 | Moroney ............. G06Q 30/018 705/52 |
| 2007/0174243 A1 | 7/2007 | Fritz |
| 2008/0049027 A1* | 2/2008 | Hauke ................ H04N 21/4751 345/502 |
| 2009/0082095 A1* | 3/2009 | Walker ................ G07F 17/3293 463/25 |
| 2011/0137706 A1* | 6/2011 | Howard ................ G06Q 30/02 705/7.29 |
| 2011/0225053 A1 | 9/2011 | Durst |
| 2012/0138671 A1* | 6/2012 | Gaede ................ G06F 16/9554 235/375 |
| 2012/0233174 A1 | 9/2012 | Hudetz et al. |
| 2014/0333508 A1* | 11/2014 | Yuann ................ G06F 3/1407 345/2.1 |

\* cited by examiner

PUBLIC DISPLAY SYSTEM ENABLING MEDIA MODIFICATION

CROSS REFERENCE

This application claims the benefit of U.S. Provisional Patent Application No. 61/994,114 filed on May 15, 2014. The prior provisional application is incorporated by reference herein in its entirety.

TECHNICAL FIELD

The invention disclosed herein relates generally to the field of image and media display, and more specifically to systems and methods for facilitating the public display of media files, such as images or video, on hosted frame displays via remote authorization.

BACKGROUND OF THE INVENTION

Mobile applications, mobile devices, "time-shifting" technologies such as DVRs, etc., continue to require new ways for advertisers to reach younger audiences. Nearly everyone now has a mobile phone or similar mobile device containing various software applications and hardware capabilities such as a GPS transmitter and a wireless transceiver, allowing for mobile communication with other devices, remote servers and the Internet. Consumers now take in media as much or more on these mobile devices as they do through traditional means such as television or magazines. Accordingly, there have been continued attempts to reach consumers with advertising through these mobile devices, or to otherwise capitalize on their prevalence and capabilities.

These mobile devices (which will be understood herein to include such things as mobile phones, PDAs, smart phones, tablets, wearable smart watches and the like) usually have a camera feature and a memory for storing digital images. Many also have a video capture capability, or at least a video playback capability, and the memory also may house digital video images. A "digital media file," as used herein, refers to a file containing data that represents digital media, such as a digital image or video. For example, files having file name extensions such as .AVI or .MPG (video), or .JPG or .BMP (image) would be digital media files. Notably, the image or video will be essentially the only data a digital media file will contain. For purposes of clarity, a lengthy text file having a .DOC file extension that happens to contain an embedded image would not be a "digital media file" as that term is used herein.

Most mobile devices are equipped with an Ios or Android operating system or the like that allows them to access, download, and operate software applications ("apps") from the Internet that are configured to run on those operating systems. One category of apps are "reader" apps that use the camera feature of the mobile device to capture a digital image and "read" it. For example, an app might capture an image of a page of a book and run optical character recognition algorithms to convert the text in a document that can be manipulated. In other instances, the reader app scans a bar code or other type of machine-readable indicia and "decodes" the information stored therein.

Though there are other types of machine-readable indicia and this term is not intended to be limited to any particular variety, both 2D and 3D barcodes (the latter referred to as quick response or "QR" code) are machine-readable indicia that have been known for many years. More recently, reader apps have been developed to read QR codes from, for example, traditional media advertisements. The reader app then interprets the QR code, which contains an internet website address, or "URL". The mobile device, also equipped with internet capability via its wireless transceiver, then accesses the URL to retrieve further content about the media advertisement, or perhaps to make a purchase. For example, U.S. Pat. No. 6,886,750, titled "Method and Apparatus for Accessing Electronic Data via a Familiar Printed Medium" describes a system that uses a "handheld feature recognition unit" to read a code from "standard printed matter" in order to access further information from a "remote data server." Various of these reader apps are now available for download and use on mobile devices, such as, for example, RedLaser by eBay, Inc. We are now seeing these QR codes frequently on printed media, and they may be connected to a coupon, a purchase offer, further information, or enrollment on a distribution list, etc.

Previously unrelated, but also known is technology directed to fixed or stationary electronic (digital) displays. As used herein, a "fixed display" shall refer to a display that is fixed to a large object, but that object may itself be mobile, such as a bus or a train. For example, an advertisement papered to the side of a commuter bus would be a "fixed display." By contrast, a "stationary display" is a display that is fixed to a stationary object—one that does not change its geographic location, such as a building, a billboard, a bus stand, or the wall of a room. All stationary displays are fixed displays, but not all fixed displays are stationary displays. Digital displays or signage, whether fixed or stationary, are used to display information of a variable nature, such as menus at a restaurant, a bus schedule, or the weather. While this can certainly be done using traditional video screens, these produce heat, are relatively expensive and heavy, require constant electricity, and can suffer from "burn-in" when a still image is displayed for too long of a time.

More preferred in some applications "electronic paper" (e-paper). Unlike conventional backlit flat panel displays which emit light, electronic paper displays reflect light like ordinary paper. Many electronic paper technologies can hold static text and images indefinitely without using electricity or experiencing burn-in. Electricity is only required to change the image being displayed on the screen. Electrofluidic displays place an aqueous pigment dispersion inside a tiny reservoir. Voltage is used to electromechanically pull the pigment out of the reservoir and spread it as a film directly behind the viewing substrate. As a result, the display takes on color and brightness similar to that of conventional pigments printed on paper. Thus, the image can be reset according to digital instruction (matching an image) and frozen in place until a next instruction is received.

Though the use and applicability of QR codes and reader applications are expanding, everything thus far has been aimed at moving a consumer from a stationary media image to a digital interface on their mobile device. Nothing has been developed that actually allows someone to harness this technology to change the stationary media image. The invention disclosed herein combines the previously unrelated technologies discussed above to dramatically expand the potential uses of scannable indicia.

SUMMARY OF THE INVENTION

According to certain embodiments, the present invention provides a system for fixed display of digital media stored on a mobile computing device on a publicly available display frame. The frame has a display screen and a wireless receiver for receiving digital media for presentation on the display screen and presents a permanent machine-readable indicia, the indicia comprising a code associated with the frame and a remote server. The mobile device comprises a memory on which is stored at least one digital media file, a wireless transceiver, a camera lens, and an application for reading the machine-readable indicia. Upon reading the machine-readable indicia, the mobile device sends a first signal to the remote server containing data associated with the machine-readable indicia, the remote server identifies the frame using at least the machine-readable indicia and sends a second signal to the mobile device requesting upload of a digital media file. The mobile device sends a third signal to the remote server containing a first digital media file from among the at least one digital media file contained in the memory, and the remote server sends a fourth signal to the frame containing the first digital media file so that the frame presents the first digital media file on the display.

According to other embodiments, the present invention provides a system for fixed display of digital media stored on a mobile computing device on a publicly available display frame. The frame has a display screen and a short-range wireless receiver for receiving digital media for presentation on the display screen and presents a permanent machine-readable indicia, the indicia comprising a code associated with the frame and a remote server. The mobile device comprises a memory on which is stored at least one digital media file, a wireless transceiver, a camera lens, and an application for reading the machine-readable indicia. Upon reading the machine-readable indicia, the mobile device sends a first signal to the remote server containing data associated with the machine-readable indicia as well as a device ID associated with the mobile device. The remote server identifies the frame using at least the machine-readable indicia, and determines if the device is authorized to post an image to the frame using the device ID. If so, the server sends a second signal to the mobile device containing an authorization code. The mobile device then transmits a selected digital image to the frame, along with the authorization code. If the authorization code matches a code stored within a memory of the frame, the frame displays the digital image.

Various other embodiments, and variations on these embodiments are disclosed. For example, the server may include a content checking algorithm and various account control measures. The frame may be configured to alternate between received media files. The server may require payment to post the image according to various payment schemes. In some cases, a user may be able to "trump" or replace an existing digital image on a frame by paying more than the previous user. In some cases, the owner of the frame, or the real estate where the frame is located, may be able to override and remove digital media, with or without contacting the remote server, depending on the embodiment. In other embodiments, the machine-readable indicia may be "registered" with a specific geographic position that can be changed via contact with the remote server.

Thus, the invention provides various new and useful systems and methods to further harness the capabilities of mobile devices and capitalize on their prevalence to display advertising or personal media in various optimum viewing locations. While certain embodiment are referenced above, other embodiments, systems, methods, features, and advantages of the present invention will be, or will become, apparent to one having ordinary skill in the art upon examination of the following figures and detailed description. It is intended that all such additional systems, methods, features, and advantages included within this description, be within the scope of the present invention, and be protected by the accompanying claims.

BRIEF DESCRIPTION OF THE DRAWINGS

The present invention can be better understood with reference to the following figures. It will be understood that the figures are not drawn to scale as to the distance between objects, or as to the relative size of the object shown.

DETAILED DESCRIPTION

Figure 1:
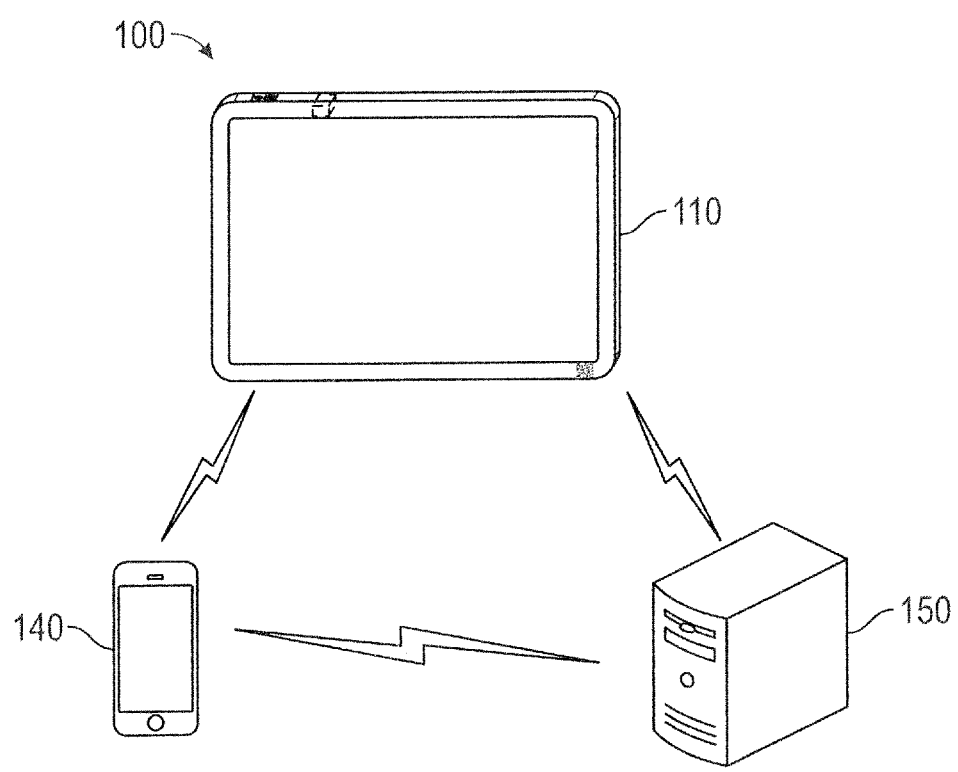
FIG. 1 shows a schematic of the primary components of the disclosed system, according to a particular embodiment.

The description that follows describes, illustrates and exemplifies one or more particular embodiments of the present invention in accordance with its principles. This description is not provided to limit the invention to the embodiments described herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements or steps may be labeled with the same reference numerals. However, sometimes these elements or steps may be labeled with differing numbers, such as, for example, in cases where such labeling facilitates a more clear description. Such labeling and drawing practices do not necessarily implicate an underlying substantive purpose. As stated above, the present specification is intended to be taken as a whole and interpreted in accordance with the principles of the present invention as taught herein and understood to one of ordinary skill in the art.

FIG. 1 discloses a schematic of the primary system components according to certain embodiments of the present invention. Here, a digital display system 100 is shown to comprise at least a mobile device 140, a display frame (or simply a "frame") 110, and a remote server 150. The remote server 150 is symbolic of a remote point of control and authorization for the digital display system 100, which might comprise thousands or even millions of frames 110 in various locations around the world. Remote server 150 may be cloud based, or exist on a distributed network. In any event, remote server 150 contains data necessary to operate the system 100, as described below, and is associated with a uniform resource locator ("URL") that can be accessed through the internet. It can receive and transmit data to and from the mobile device 140 and, in some embodiments, can transmit and receive data to and from frame 110.

It should be noted that, when data is said to be transmitted to or received from one device or another, the transmission need not be explicitly direct. Rather, by way of the nature of the internet, the data may pass through various routers and other servers along the way. However, the data transmission initiates from the transmitting item and is intended to terminate with the receiving item.

Mobile device 140 is exemplary of any small mobile computerized device, such as, but not limited to, mobile phones, PDAs, smart phones, tablets, wearable smart watches and the like. However, mobile device 140 does have certain features and aspects according to the exemplary embodiment. Though one exemplary mobile device 140 is shown in FIG. 1, it will be understood that thousands, or even millions of mobile devices 140 could be equipped to operate within system 100.

Figure 2:
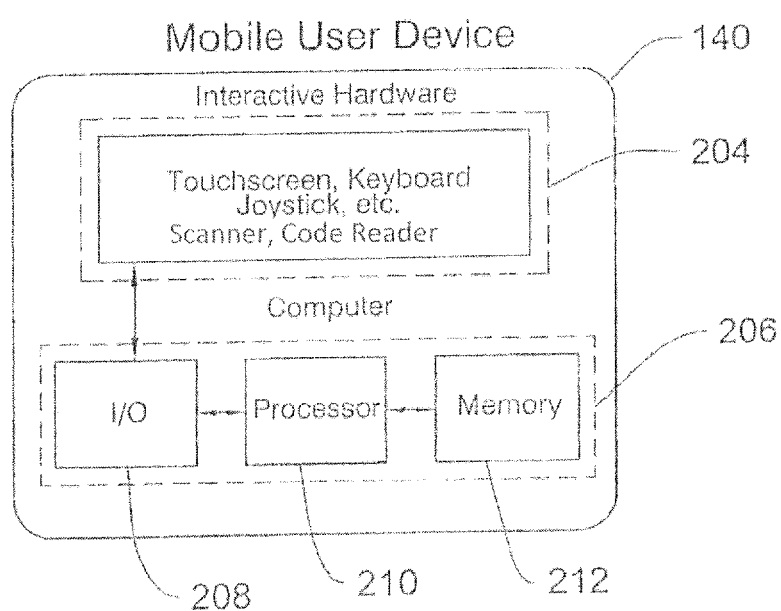
FIG. 2 depicts hardware aspects of a mobile device used for facilitating aspects of the invention.

Referring to FIG. 2, a schematic diagram of certain aspects of an exemplary mobile device 140 is provided. Mobile device 140 includes an interactive hardware portion 204 and a computer portion 206. The interactive hardware portion 204 can include one or more of a touch screen, a keyboard, a stylus, a joystick, a microphone, a camera and the like, which can be arranged in various manners and have different shapes without changing the spirit of the interaction of the hardware portion 204 with the computer portion 206. The touch screen can be a liquid display crystal (LCD), display screen, a plasma screen, a light emitting diode (LED), or any other screen capable of displaying text and images.

The computer portion 206 includes an input/output (I/O) portion 208, a central processing unit (CPU) portion 210 (i.e., a microprocessor), and a memory 212. The CPU portion 210 can be any computer-processing unit from a singular microchip to extensive microchip configurations. The memory portion 212 can include, without limitation, any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory portion 212 may incorporate electronic, magnetic, optical, and/or other types of storage media, and can have a distributed architecture where various components are situated remote from one another, but are still accessed by CPU portion 210. The interactive hardware portion 204 is coupled to the I/O portion 208 such that a command entered by a user or customer through the interactive hardware portion 204 will be forwarded to the I/O portion 208, to the processor portion 210 and then to memory portion 212.

Figure 3:
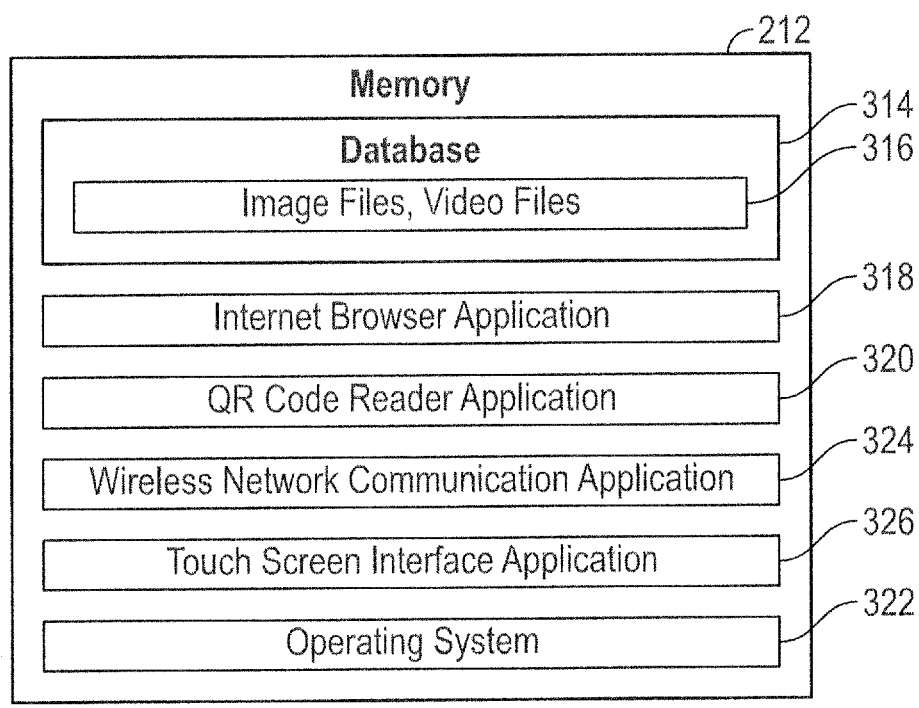
FIG. 3 depicts contents of a memory component of the mobile device of FIG. 2.

As illustrated in FIG. 3, a schematic diagram of the memory portion 212 of FIG. 2 is shown. The memory portion 212 can include or store a database 314, executable programs 318, 320, and 324, and an operating system 322. The database 314 can store data, such as, for example, digital media files that have been captured by the camera component of the interactive hardware portion 204. The executable programs include an internet browser application 318, a touch screen interface application 326, a QR code (or other machine-readable indicia) reader application 320, and a wireless network communication software application 324. Various other executable programs may also be stored in memory 212 that are unrelated to the present invention. In some embodiments, there may be a downloaded application 300 that provides a unique interface for interacting with, and stores user data associated with, display system 100. However, in the illustrated embodiment, the application for interacting with the system is housed on the remote server 150 and accessed through internet browser application 318. When the user computing device 140 is in operation, the processor 210 is configured to execute software stored within the memory 212 to communicate data to and from memory 212 and to generally control operations of user computing device 140 pursuant to the software. Application software is read by the processor 210, perhaps buffered within the processor 210, and then executed.

Figure 4:
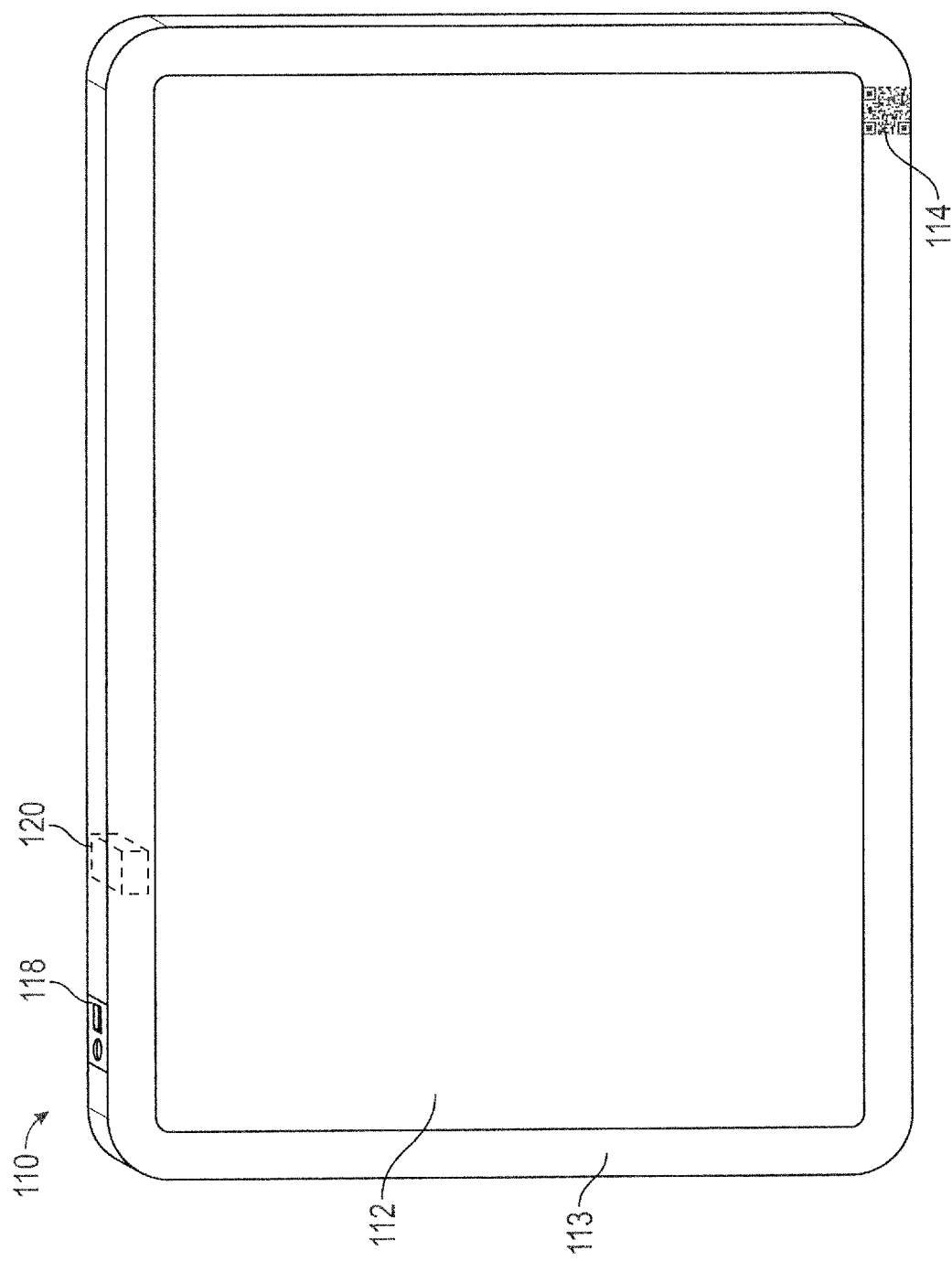
FIG. 4 depicts a digital display frame, according to certain embodiments of the present invention.

FIG. 4 depicts an image of a typical display frame 110. It will be understood that display frames, or simply frames, can take on various shapes and sizes. For example, a frame intended to be mounted on an interior wall of a commercial establishment may be no larger than a typical sheet of paper (11.5×7 inches). However, a frame intended to be mounted to a bus stand might be 6 feet by 4 feet or larger. There is no theoretical limit to the size of a frame, but there are practical ones in that a user must be close enough with a mobile device to scan an indicia, as discussed below. There is also no particular thickness requirement of a frame. Frames will desirably be thin, and may be designed to adhere or otherwise be fixed to, for example, the side of a bus, in which case a very thin design would be preferred.

Frames all comprise a display screen 112, a border 113 around the display screen, and a machine-readable indicia 114, typically along the border, such as shown in FIG. 4. The border can be very thin, so as to maximize the size of the display screen. The indicia 114 can be located on the screen 112, but this is not preferred because it will block out a portion of a digital image to be displayed. The display screen 112 may be of a typical light-emitting flat panel variety. However, it is preferably of an e-paper variety that reflects light, allowing it to store an image without power once the image is cast into the e-paper. This also allows the display screen 112 to be very thin, and even flexible. In some cases, the frame will have a back pane connecting the border across the back of the display screen that will further comprise a hook, groove, screw holes, or other means to fix the display to a wall, just as a common picture frame might have.

Typically embedded within the border 113 is a power inlet 118 and a control module 120. The power inlet may be of a standard variety, and the frame would come with a wired plug that would fit into a standard wall outlet. Alternatively, outdoor frames may be equipped with solar powered receivers and capacitors for storing power so as to either emit (standard display) or re-cast (e-paper) digital images. The control module 120 comprises a small memory and a processor. The memory houses the digital media file for the digital media being displayed, and may hold multiple digital media files that alternate via the instructions of the processor. For example, the processor could be configured to alternate between four media images, changing the screen 112 every 30 seconds. When a fifth media image is received, the first of the four files that was received by the frame 110 is deleted from the memory and replaced by the new file. This alternating scenario is helpful to prevent burn-in where traditional image emitting screens are used.

The processor is connected to a wireless receiver housed within the control module 120. The wireless receiver may also have transmission capabilities, and may be short range or long range. In some embodiments, the receiver is long range and has an IP address associated with it, such that the frame can be reached directly by remote server 150, such as to receive instructions or digital media files. In other embodiments, the receiver is short range (e.g., bluetooth, near field, RFID, infrared, etc.). In these embodiments the instructions and files come from the mobile device, but are still authorized remotely as described below.

Though there are essentially an unlimited number of potential QR codes based on the latest versions being produced, there is a cost to generating a unique code (or other indicia) for each frame. For example, if the system is to have a million frames across a vast geography, it would be much cheaper to only produce, say 1000 varieties (i.e., each unique code would be on 1000 different frames). However, as will be seen, a critical aspect of the invention according to certain embodiments is for the remote server 150 to be able to identify the exact frame to be changed using the machine-readable indicia. Of course the system would operate fine if all of the codes on all of the frames were unique, but if multiple frames share an indicia, there must be another distinguishing feature. In this case, the location of the frame in question becomes important.

Because most mobile devices 140 have a GPS transmitter, and the device must be co-located with the frame 110 in order to scan the indicia 114, this aspect of device 140 can be harnessed without needing to put a GPS transmitter in the frame 110. Instead, the location of the frame (assuming it is "stationary" and not just "fixed" as described above) can be pre-registered with the remote server 150. This can either be done via a separate application through the internet by the owner of the frame 110 or, in some embodiments, by the frame directly when a registration feature is selected on the display. (Obviously such a feature would be password controlled). This feature would send a signal to the remote server 150 with data representing the frames present location. Thus, if a frame were moved from one address to another, it could be re-registered using this feature. The registered location would be saved in a database accessible by the remote server. In this manner, when a mobile device 140 contacts the remote server 150 and provides the indicia data from the machine-readable indicia, it also sends location data that the server 150 can cross-reference with the indicia data to identify a particular frame 110. So long as no two frames bearing the same machine-readable indicia are located within a close proximity, the identification should be a positive match. Because remote server 150 knows where all of the registered frames 110 are located, a proper registration algorithm could prevent even the possibility of two frames bearing identical machine-readable indicia being too closely located by sending an error message, for example, to a registered email of the owner of the frame being registered.

Each frame 110 typically has a home or base image loaded in the memory that it returns to either after a set time or upon command. For example, if a user uploads an image onto the display using the display system 100, it is not meant to be permanent. They may have paid for a certain amount of time for it to be displayed, or it may be replaced by a next user in certain scenarios. In one example, for instance where a frame is located at a popular bar, the owner of the frame may wish to reset the frame 110 to the base image each day so as to inspire unique and new images and use each night. Payment scenarios might be set up such that a first upload is merely a few cents (to inspire usage), but each subsequent upload is incrementally higher in order to displace the previous image. By the end of the night, customers may be paying many dollars to "trump" the prior image and have their media displayed.

In other instance of more of a commercial or advertising nature, an advertisement might be placed such that it is in a key location at an opportune time—such as near a polling location just before an election, or outside a concert hall days before the concert. These images would want to be reset after the event is over. The override feature may also be necessary, in some instances, to takedown offensive or inappropriate content. There are several features for addressing this issue, including image analysis routines on the remote server 150, and requiring pre-registration of mobile devices that with to interact with the system 100. In this latter instance, a digital token would be assigned by the system and stored on the mobile device 140. The token would then be requested by and submitted to the remote server 150 when the mobile device 140 is being used to upload a digital media file. This would allow tracking and accountability of the content posted in the system by users and could result in their privileges being revoked.

In still other scenarios, specific frames may be owned by (or rented by) a particular company and the spaces where they are located are rented from the owners of that real estate. The company would only want these frames to be altered by certain mobile devices. In this case, a digital token list would be maintained specific to that frame at the remote server 150. If a request to change the digital media on the frame arrives to the server 150 without a digital token that matches the list, the request will be denied. However, even despite all of these protection measures, an override feature is typically provided such that the owner (or local establishment operator, etc.) can immediately, and without charge, reset to the base image.

Figure 5:
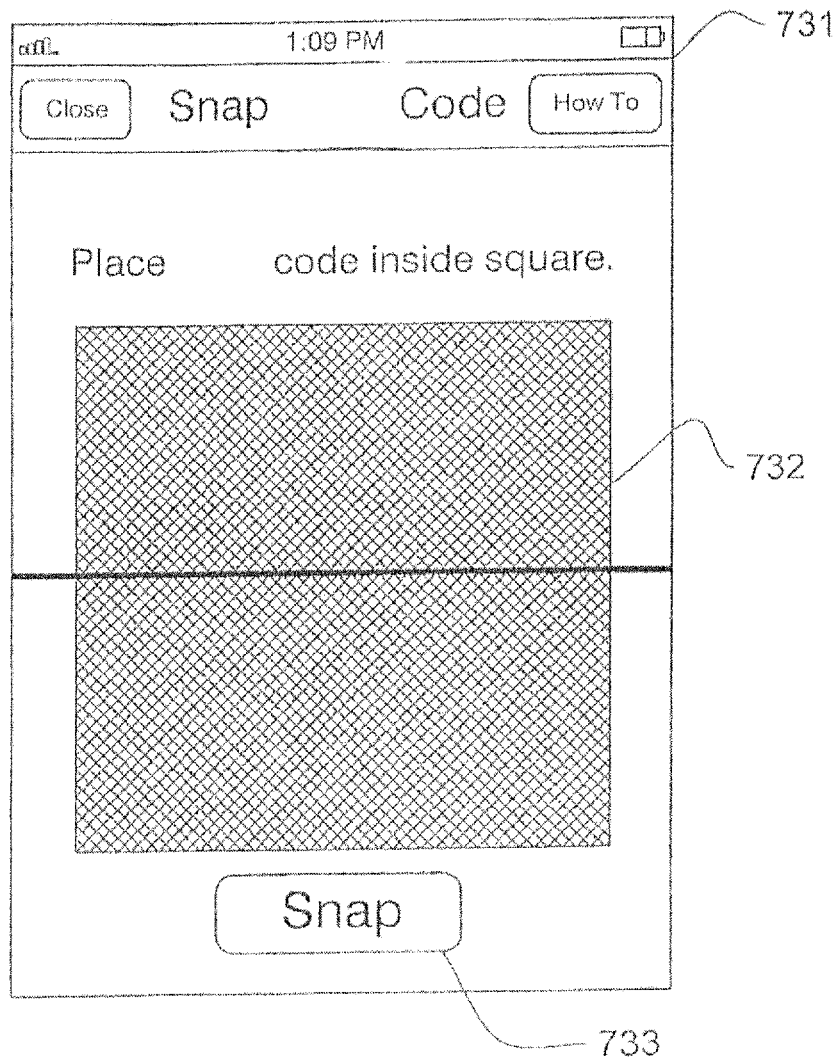
FIG. 5 displays an exemplary screen view on the mobile device that is operating a QR code reader application according to certain embodiments.

The system 100 operates to allow users with mobile devices 140 change the digital media in a given frame 110 by sending indicia data associated with the frame to the remote server. As previously mentioned, most mobile devices 140 have a QR code reader application, or the like. A window within such an application is shown in FIG. 5. The application harnesses the camera hardware of the device to generate an image capture window 732 on the front screen that shows what the camera is viewing. In use, the user aligns the image capture window 732 to show the machine-readable indicia 114 on the frame 110 and "snaps" the image with capture button 733. The software then interprets the indicia 114 to extract the indicia data. The indicia data includes the a URL for the remote server 150 and information used by the server to identify the frame 110 that was scanned. This scanning action is represented by the arrow marked "1" in FIG. 6.

Figure 6:
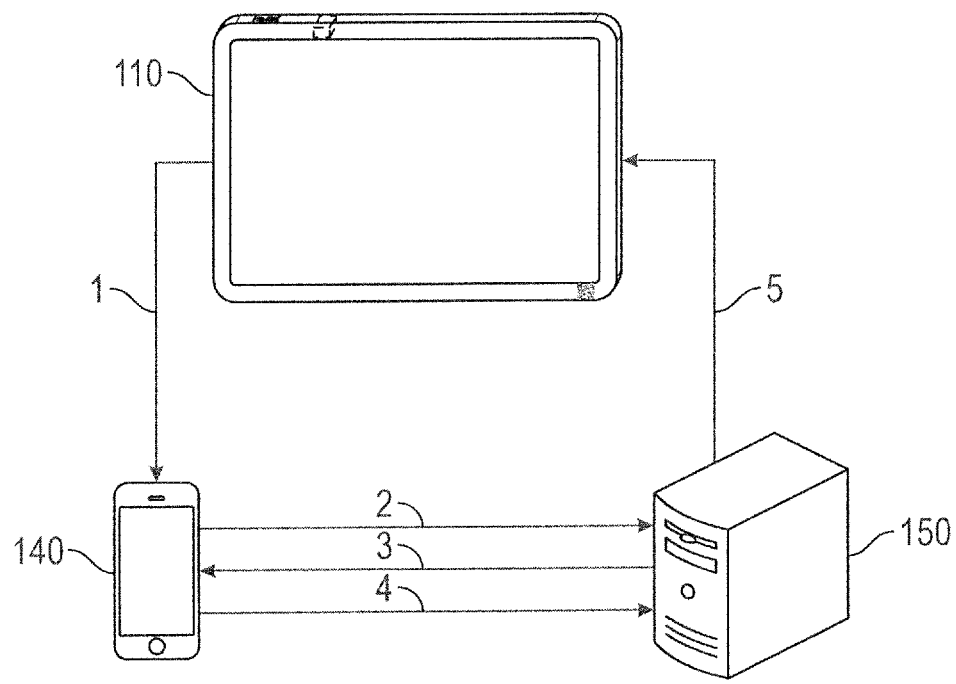
FIG. 6 is a schematic diagram of the data transmissions between system components during operation of the system according to a particular embodiment.

Continuing on FIG. 6, once the scan is read, the mobile device 140 transmits the indicia data (and possibly GPS data from the mobile device and a digital token) to the remote server 150 (arrow "2"). The remote server accesses a database and uses the indicia data (and possibly the GPS data) to isolate the particular frame 110 that the system user is trying to update. The server may also read from the database additional information about this particular frame, such as, for example, the pricing structure that the frame owner has specified, any limitations as to media content (whether physical such as color or pixel limitations or content-based), etc. It may also check to see if the frame may be updated by the user. For example, if there is a digital token required, does it match? Has the prior purchaser paid some premium to guarantee a specific length of display time that has not yet expired? If so, the prior use may not be "trumped" and the request will be denied. However, if an update is authorized, the server will transmit a request back to the mobile device 140 (arrow "3") for the user to upload the desired digital media. It will also (in paid embodiments) submit a price or pricing options. The price can be based on numerous factors, such as, for instance, inputs from the owner of the frame, a prior price paid by the last user, the resolution the new user wants to get, or the time the new user wants the new media to be displayed. Video may come at a higher premium to still images, for example.

Arrow "4" is the user's submission back to the remote server 150 from the mobile device 140 with the digital media file of choice and, if applicable, payment instructions. Payment may be facilitated by any variety of existing e-payment means such as, for example, a PayPal deduction, etc. Once the file is received and payment is authenticated, the remote server 150 may run certain checks or analysis on the file. A rudimentary check would simply involve a system operator reviewing and approving the image for upload. A more sophisticated, automated analysis might involve running various image analysis algorithms to identify inappropriate material, or material that does not align with the usage guidelines provided for the particular frame 110 by the frame owner. If this analysis checks out, the server 150 (arrow "5" submits the digital media file to the particular frame 110.

Ideally, the frame 110 is as inexpensive as possible and has little on-board logic. It receives the file from the server 150, which is sufficient instruction for it to replace the existing media with the media contained within the new media file (or possibly to place the new media file into an alternating rotation and cast out the oldest of those previously in the rotation, etc.) However, it is possible to place some of the error checking or payment information on the frame itself instead of on the server. The update itself is done by the control module within the frame 110. The file is received by the wireless receiver which can be triggered to "power on" the rest of the functionality of the frame. This helps conserve energy when the frame 110 is otherwise simply displaying a still image on e-paper or the like. The controller interprets the digital image file to align the pigments in the e-paper, or otherwise updates the light-emitting screen to display the new media.

Figure 7:
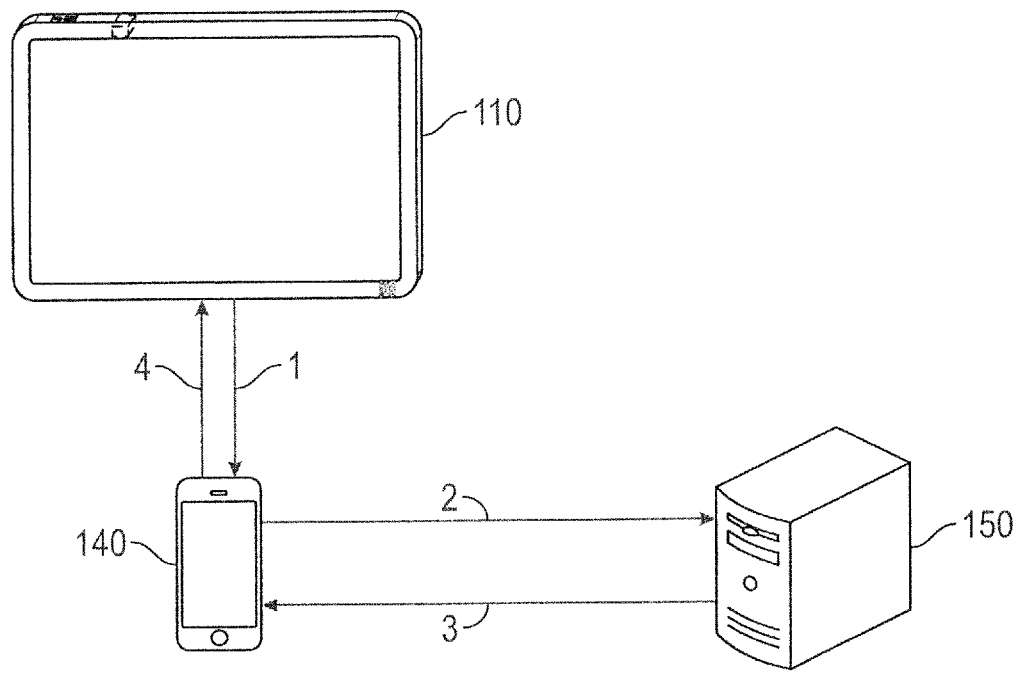
FIG. 7 is a schematic diagram of the data transmissions between system components during operation of the system according to a alternative embodiment.

In order for the above scenario to work, each frame must have an IP address associated with it and operate at a sufficient power to keep the receiver operating. Alternatively, there could be a power-management module that shuts down the receiver and only turns it on periodically to check for updates. However, in other embodiments, such as that shown in FIG. 7, the frame 110 has no IP address or broadband wireless receiver. Instead, it has only a passive, short-range receiver such as bluetooth or Passive RFID. These operate at almost no power, and can work on battery for some time. However, in such cases, the image file and instructions cannot come from the remote server. Instead, they must be received directly from the mobile phone 140.

In order to operate such a configuration of system 100 and still allow for the controls and features offered by remote server 150, an authentication code is used. The steps associated with Arrows 1 and 2 on FIG. 7 operate in the same manner as they did in FIG. 6. However, if the frame 110 identified in Step 2 is eligible for updating by the user of the mobile device 140 at that time, an authorization code is returned to the mobile device 140. The authorization code may be a variable number that alternates in sync with a similar number stored in the memory of the frame 110, for example. The mobile device then transmits the digital media file directly to the frame 110, along with the authorization code (Arrow 4). If the code matches, the new media is displayed. If the particular display 110 is a paid display, there will be the additional steps of sending payment request from server 150 to mobile device 140 and replying with payment instructions/authorization. In some embodiments, the image may still need to be uploaded for inspection by the server 150. If inspection passes, the digital image file will be amended with the authorization code and sent back to the mobile device 140. Both the frame 110 and the remote server 150 (but not the mobile device 140) will be configured to extract the code from the digital media file. In this manner, when the file arrives at the frame from the device 140, the frame 110 will be able to determine whether it is authorized for display.

Other options for the system include: (1) repeatable playback and looping of submitted short videos; (2) a mass upload to automatically request posting of an image to multiple frames within a specific geographic area (zipcode, precinct, county, etc.)—this could involve a mapping algorithm that strategically places the postings so they aren't too close, special discounts for volume could apply . . . the postings would still need to be in line with the parameters set by the owner of the frames in question—some might opt out while others opt in to mass posts; (3) physical key to override; (4) note that fixed (but mobile) frames will need to have truly unique indicia because GPS will not work; (5) sign-up and download features to enroll involving signing on to EULA, etc.

Accordingly, it should now be clear how the digital display system 100 can be used to change fixed displays or stationary displays of digital media using a mobile device. Any process descriptions or operative steps in using the system should be understood to be exemplary, and alternate or additional steps or series of steps may be included within the scope of the present invention, as would be understood by those having ordinary skill in the art. It should be emphasized that the above-described exemplary embodiments of the present invention, and particularly any "preferred" embodiments, are possible examples of implementations, merely set forth for a clear understanding of the principles of the invention. Other variations and modifications may be made to the above-described embodiments of the invention without substantially departing from the spirit and principles of the invention. All such modifications are intended to be included herein within the scope of this disclosure and the present invention and protected by the following claims.

What is claimed is:

1. A system for changing an image or video displayed on a display screen, the system comprising:
   a mobile device comprising a scanner, a GPS transmitter, a wireless transceiver, and a memory, the memory comprising a first digital media file and a software application configured to read and interpret machine-readable indicia;
   a first frame housing the display screen, the first frame comprising a wireless receiver and presenting a first machine-readable indicia that comprises first indicia data for use in identifying the first frame and a URL address;
   a remote server associated with the URL address and configured to verify a payment; and
   an analysis routine on the remote server to analyze digital media files;
   wherein the software application of the mobile device, upon reading the first machine-readable indicia and interpreting the first indicia data, causes the mobile device to transmit a first signal containing the first indicia data, a replacement image or video, and a payment offer to the remote server at the URL address;

wherein:
if the remote server verifies the payment offer is greater than a payment previously received by the remote server in association with a current image or video displayed on the display screen; and
if the analysis routine does not reject the replacement image or video;
then the remote server transmits a second signal back to the mobile device containing an authorization code that authorizes the first frame to replace the current image or video with the replacement image or video upon receipt of the authorization code from the mobile device, regardless of how long the current image or video has been displayed;
wherein the first frame further comprises a registration feature configured to transmit a third signal to register a geographic location of the first frame with the remote server.

2. The system of claim 1, wherein the mobile device transmits the authorization code to the wireless receiver of the first frame using short-range wireless technology.

3. The system of claim 2, wherein the first frame further comprises a memory and a processor, and wherein the processor verifies the authorization code received from the mobile device matches a code stored in the memory prior to displaying on the display screen the replacement image or video.

4. The system of claim 3 wherein the memory can store a plurality of digital media files, and wherein the processor is configured to alternate between displaying on the display screen the replacement image or video and an image or video associated with a previously received digital media file.

5. The system of claim 1, wherein the first frame presents on the display screen an image and, once the image is displayed, uses no electricity to maintain the image on the display screen.

6. The system of claim 1, wherein the remote server uses the geographic location of the mobile device received via the GPS transmitter in combination with at least a portion of the first indicia data to identify the first frame.

7. The system of claim 1, wherein the machine-readable indicia is unique to the first frame.

8. The system of claim 1, further comprising a second frame, the second frame having a display screen and a wireless receiver, and presenting a static machine-readable indicia, the static machine-readable indicia comprising second indicia data that is identical to the first indicia data.

9. The system of claim 8, wherein the remote server accesses a data file that contains data identifying a last geographic registered location for each of the first frame and the second frame.

10. The system of claim 9, wherein the remote server selects from between the first frame and the second frame based on which one has the last geographic registered location approximately matching the geographic location of the mobile device received via the GPS transmitter.

11. The system of claim 1, wherein the mobile device contains a digital token previously received from the remote server, wherein the digital token is sent with the first signal, and wherein the remote server confirms accuracy of the digital token before sending the second signal.

12. The system of claim 11, wherein the remote server has access to a data file that contains data associating the digital token with the first frame, and wherein the remote server confirms that the digital token is associated with a mobile device that is authorized to update the first frame before sending the second signal.

13. The system of claim 1, wherein the remote server is configured to transmit subsequent authorization codes authorizing new images or videos to be displayed on the first frame each time an incrementally higher payment amount is verified until the display screen is reset to a base image.

14. The system of claim 1, wherein the first frame further comprises an override feature that allows an operator to reset the display screen in response to a failure of the image analysis routine.

* * * * *